Patented Jan. 7, 1941

2,227,523

UNITED STATES PATENT OFFICE 2,227,523

COMPLEX METAL COMPOUNDS OF AZO DYESTUFFS

Willi Widmer, Basel, Switzerland, assignor to the firm Society of Chemical Industry in Basle, Basel, Switzerland No Drawing. Application July 25, 1938, Serial No. 221,231. In Switzerland August 7, 1937

5 Claims. (Cl. 260—147)

This invention relates to the manufacture of valuable azo-dyestuffs by coupling with a pyrazolone whose 1-position is occupied by hydrogen a diazo-compound from an amine of the general formula

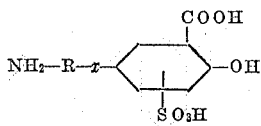

in which $x$ is one of the groupings —$SO_2$—NH— or —NH—$SO_2$—, and R is a benzene residue; if desired, the azo-dyestuff thus obtained may be treated with an agent yielding metal.

The formula

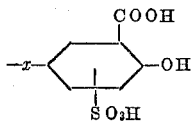

is understood to mean that the sulfonic acid group may stand either in 5- or in 6-position of the benzene nucleus, or that mixtures of these two isomers may be used for the present process.

The amines of the above general formula serving as parent materials may be obtained, for example, by condensing a nitrobenzenesulfonic acid halide with a sulfonated 1-amino-4-hydroxy-benzene-3-carboxylic acid and reducing the nitro-group in the usual manner. A suitable amine is, for example 1-(3'-amino-benzene-1'-sulfoyl)-amino-4-hydroxy-3-carboxybenzenesulfonic acid. The benzene residue R and the salicylic acid residue may contain further substituents. The $NH_2$-group in the benzene radical R may be attached in ortho- or in para-position to the grouping $x$. Especially good results are obtained if it occupies the meta-position. The benzene radical R may be further substituted e. g. by halogen, nitro-, alkyl-, alkoxy- and sulfonic acid groups. The salicylic acid radical too may carry a further substituent, e. g. a methyl group.

Pyrazolones whose 1-position is occupied by hydrogen which may be used as coupling components for this invention may contain various substituents in the remaining positions, for example alkyl or carboxyl groups. Especially suitable is, for example, 3-methyl-5-pyrazolone.

The diazo-compounds of the amines of the above general formula are advantageously coupled with the pyrazolones in alkaline medium.

The dyestuffs obtainable by the invention are useful for dyeing and printing animal fibers, for instance wool, silk and leather. Excellent yellow tints are obtained, which when after-treated with an agent yielding metal in the dyebath or on the fiber, preferably when after-chromed, are very fast.

Especially valuable products are produced by treating the azo-dyestuff in substance with the agent yielding metal. The treatment with the agent yielding metal, for instance chromium, copper, nickel, cobalt or iron, may be conducted in known manner by heating in acid, neutral or alkaline medium with or without suitable additions, for instance an inorganic salt or an organic salt, for instance common salt, sodium acetate or sodium tartrate in presence or absence of an organic solvent or diluent, for instance alcohol, glycerine, pyridine, and in an open vessel or under pressure. Especially good results are obtained by using an agent yielding chromium; however, other agents yielding metal and, if desired, more than one metal, may be brought into contact with the dyestuffs mixed with each other or in succession.

The dyestuffs containing metal in complex union are advantageously used in dyeing and printing animal fibers. Very uniform yellow tints of good properties of fastness are obtained.

The following examples illustrate the invention, the parts being by weight:

Example 1

38.8 parts of 1-(3'-aminobenzene-1'-sulfoyl)-amino-4-hydroxy-3-carboxybenzenesulfonic acid of the formula

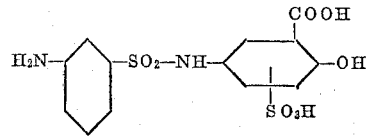

are diazotized and coupled in the usual manner with 10.3 parts of 3-methyl-5-pyrazolone in alkaline solution. When coupling is complete, the mixture is acidified with hydrochloric acid, whereby the dyestuff is nearly completely precipitated; some common salt is added and the precipitate is filtered, washed with common salt solution of 5 per cent strength and dried. The dyestuff thus obtained dyes wool yellow tints which are very fast when after-chromed.

The 1-amino-3-carboxy-4-hydroxybenzenesulfonic acid required for making the parent material of the above formula is obtained by sulfonating 1-amino-4-hydroxybenzene-3-carboxylic acid until one sulfonic acid group is introduced.

Example 2

The dyestuff paste obtainable as described in Example 1 which contains about 20–25 per cent of dyestuff is dissolved in the undried condition in 500 parts of water with aid of heat, and to the solution is added a chromium sulfate solution of about 8 per cent strength, which contains 9.25 parts of $Cr_2O_3$ and the whole is boiled under reflux for 20 hours. It is then neutralized with sodium carbonate, and the dyestuff is salted out with common salt. The dry dyestuff is a yellow powder soluble in water and concentrated sulfuric acid to a yellow solution and dyeing wool in a sulfuric acid bath uniform pure greenish-yellow tints of excellent fastness.

What I claim is:

1. Complex metal compounds of azo-dyestuffs of the general formula

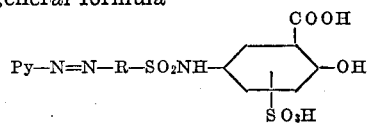

in which Py is the radical of a pyrazolone whose 1-position is occupied by hydrogen and R is a benzene radical.

2. Complex chromium compounds of azo-dyestuffs of the general formula

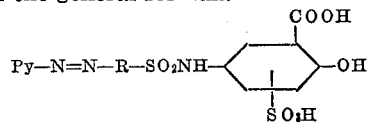

in which Py is the radical of a pyrazolone whose 1-position is occupied by hydrogen and R is a benzene radical.

3. Complex chromium compounds of azo-dyestuffs of the general formula

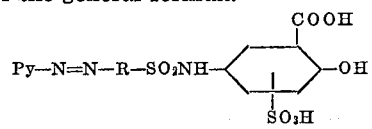

in which Py is the radical of a pyrazolone whose 1-position is occupied by hydrogen and R is a benzene radical containing the azo-group and the sulfamido group in meta-position to each other.

4. Complex chromium compounds of azo-dyestuffs of the general formula

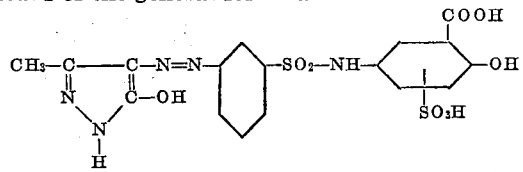

which products dye animal fibers uniform and fast yellow tints.

5. Complex chromium compounds of the azo-dyestuff of the formula

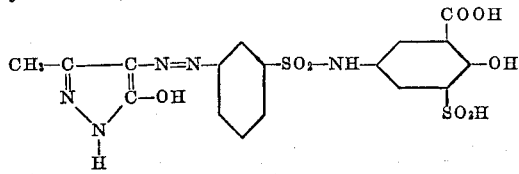

which products dye animal fibers uniform and fast yellow tints.

WILLI WIDMER.